US012579879B2

(12) United States Patent
Glaeser

(10) Patent No.: US 12,579,879 B2
(45) Date of Patent: Mar. 17, 2026

(54) WATER SAFETY DEVICE

(71) Applicant: Colleen Elizabeth Glaeser, London (GB)

(72) Inventor: Colleen Elizabeth Glaeser, London (GB)

( * ) Notice: Subject to any disclaimer, the term of this patent is extended or adjusted under 35 U.S.C. 154(b) by 29 days.

(21) Appl. No.: 18/291,970

(22) PCT Filed: Jul. 28, 2022

(86) PCT No.: PCT/IB2022/057017
§ 371 (c)(1),
(2) Date: Jan. 25, 2024

(87) PCT Pub. No.: WO2023/007437
PCT Pub. Date: Feb. 2, 2023

(65) Prior Publication Data

US 2024/0378978 A1 Nov. 14, 2024

(30) Foreign Application Priority Data

Jul. 29, 2021 (GB) ..................................... 2110971

(51) Int. Cl.
*G08B 21/08* (2006.01)

(52) U.S. Cl.
CPC .................................. *G08B 21/084* (2013.01)

(58) Field of Classification Search
CPC .................................................... G08B 21/084
See application file for complete search history.

(56) References Cited

U.S. PATENT DOCUMENTS 10,665,073 B1 * 5/2020 Richerson, Jr. ........ G03B 29/00
11,004,324 B1 5/2021 Henares
11,322,010 B1 * 5/2022 Madden ............... G08B 21/086
2005/0088522 A1 * 4/2005 Creviston ............. H04N 5/782
348/148

FOREIGN PATENT DOCUMENTS

CN 110807900 A 2/2020

* cited by examiner

*Primary Examiner* — Davetta W Goins
*Assistant Examiner* — Sharmin Akhter
(74) *Attorney, Agent, or Firm* — Carmody Torrance Sandak & Hennessey LLP

(57) ABSTRACT

A water safety device (10) that is adapted to float on water includes an arrangement of video cameras, an accelerometer and a processor. In use, the device floats, for example, in an unattended swimming pool. If an object falls in the pool, the resulting wave disturbance will buffet the floating device, which causes the onboard accelerometer to generate a signal. The video cameras are arranged at the same horizontal level around the periphery of the safety device and, as the device floats, its weight is such that the cameras are positioned at or near the water's surface. In this way, potential drowning incidents will be viewed, in a vertical plane at least, in the centre of at least one camera's field of view. In some embodiments, activation of the video cameras causes an alert to be sent to a remote device (66) and/or to activate an alarm (54) on the device.

19 Claims, 5 Drawing Sheets

WATER SAFETY DEVICE

This invention relates to the field of safety systems and, in particular, to devices of the type that undertake some form of continuous monitoring with a view to generating an alert following detection of an unexpected event. A particular application is to improve safety around unattended water hazards such as swimming pools.

Swimming pools are popular throughout the world and, unfortunately, drowning accidents are not uncommon. Even in the UK, in which there is a relatively small number of residential pools, around 700 people drown every year. In the US, the figure is around 10 per day. For children, water represents a particular hazard: in most countries, drowning is one of the top five causes of death for people aged 1-14 years. In China it is the leading cause; in the US it is the second leading cause of unintentional injury death in this age group. Even if the injury is not fatal, a near-drowning incident can result in brain damage with long-term health issues including memory and learning problems.

Public pools provide lifeguards when the pool is in use and, for the most part, are able to prevent access when the pool is closed. The same does not hold true for hotel pools: even if usage levels merit the employment of lifeguards, it is often impossible to prevent access to an outdoor pool at night. There is still less in the way of security at residential pools.

Some outdoor pools may be equipped with security cameras. These are generally arranged to detect movement within a field of view and so will generate an alarm when an unauthorised person enters a particular area.

Such cameras can be set up to monitor the vicinity of a pool but they are more suited to intrusion detection than to maintaining safety. Moreover, a full security system is likely to be prohibitively expensive for a residential pool, despite the fact that it is here that safety concerns are most pressing. US 2019/0246030 discloses a buoyant camera system specifically designed for swimming pool surveillance. This system includes a pair of cameras: one configured to image above the water and the other below. The cameras are linked to an application running on a mobile device that allows a user to keep a watch on the pool from a remote location.

There is a perceived need for a device that is more directly geared to pool safety rather than to surveillance, the cost of which would make it attractive for use in a residential pool. It is accordingly an object of the present invention to provide a safety device that is capable of monitoring a pool and generating an automatic alert in the event of a potential drowning incident.

According to a first aspect, the present invention provides a safety device adapted to float on water, the device incorporating:

- at least two video camera systems with lenses arranged at a horizontal level around a periphery of the safety device, each camera having a field of view that extends both vertically and horizontally;
- an accelerometer arranged to generate a voltage signal in the event that the safety device experiences an accelerating force;
- a processor in communication with both the accelerometer and camera systems and arranged such that on receipt of a voltage signal from the accelerometer that exceeds a threshold value, the processer causes the safety device to enter an alert mode in which power is supplied to the camera systems such that each generates an image of its field of view.

The safety device of this invention is advantageous in a number of ways. First, it is not a surveillance device that continuously captures images. Rather, in the device of this invention, video recording begins only once a trigger is received that is consistent with water disturbance caused by a person having fallen into the water. At all other times, the cameras remain switched off in order to conserve power. With reduced camera recording time, videos are of shorter duration, making it easier for a user to find evidence of any events that should be a cause for alarm from within the images collected. The accelerometer provides the trigger that switches the device to its "alert" mode. If a person or object falls into a pool, the resulting disturbance will generate waves that propagate across the water surface. Anything floating on the surface will therefore be moved in various directions as the waves pass. If a safety device in accordance with this invention is on the water surface, such movement will be transferred to the onboard accelerometer, which will generate a voltage in response. It is this voltage that is used as the trigger signal.

Secondly, the arrangement of cameras is a significant improvement over that disclosed in US 2019/0246030. In the prior art device, cameras are positioned above and below the waterline. Despite the (horizontal) 360° field of view, which is achieved by rotating each camera, anything occurring on the water's surface remains at the edge of each camera's range. Unfortunately, the surface is precisely where attention needs to be focused if early warning of a potential drowning incident is needed. That is, identification of the most dangerous scenarios will require information obtained at the limits of the cameras' capabilities. By way of contrast, the cameras of the present invention are arranged in the same horizontal plane. When the safety device is placed on water, the weight of the device is set such that it floats at a level that positions the camera lenses at or near the surface. In this way, potential drowning incidents will be viewed, in a vertical plane at least, in the centre of at least one camera's field of view. In the horizontal plane, coverage will depend on the angular field of view of each camera. Ideally, the number of cameras and field of view of each will be selected such that a 360° view in a horizontal direction is provided by the whole camera system.

The device may further include a transceiver, the processor being arranged such that when the device enters the alert mode, it transmits an alert signal to a remote device. The remote device can be a smartphone, tablet, personal computer or the like. This signal is used to make the user of the remote device aware that the safety device has been triggered by an event that may lead to a potential drowning. With this knowledge, the user can take appropriate action.

Preferably, the device includes a battery. This battery is a source of power for the cameras, accelerometer, processor and any other electronic components that may be installed on the device. With a battery installed, there is no need for to supply mains electricity to the device. This not only makes it easier to maintain electrical safety in water but also avoids the need for a cable, which would present a trip hazard. In this embodiment therefore, the device, in use, floats untethered on the water.

It is in this embodiment that the reduction in power consumption gained by limited operation of the cameras is most advantageous. In reducing power consumption, battery throughput is reduced, which in turn prolongs battery life. In embodiments in which the safety device is designed to be disposable once the battery fails, the working life of the device is also increased. This advantage is enhanced further in an embodiment in which the device includes at least one solar cell electrically connected to the battery. Charge accumulated in the solar cell is passed to the battery and so prevents it becoming depleted, reducing the requirement for external charging. Such improved maintenance of battery charge levels will also extend its life.

The device preferably includes at least one of: a light-emitting beacon and a siren, the device being configured such that power is supplied to the at least one of the beacon and siren in the alert mode. This feature serves to alert anyone in the vicinity of the device of a potential drowning, possibly enabling help, if needed, to arrive sooner.

The camera lenses may be better protected if located in respective recesses within a body of the safety device. In a preferred embodiment, the device includes three camera systems with respective lenses arranged around the periphery of the device. In order to provide a 360° panoramic view, each camera in this embodiment preferably has at least a 120° field of view in a horizontal plane.

The accelerometer may be replaced by an array of accelerometers spatially distributed about the device. This improves the responsivity of the device across a full range of movement. The threshold voltage level may be determined with reference to respective voltage signals from each accelerometer within the array.

It is greatly preferred that image data representative of the images generated by the camera systems is transmitted to a remote location. This may be to a computing device, such as a smartphone or tablet, or to storage in the cloud. This feature enables long-term storage of the images in a manner that also allows them to be readily accessed.

After a pre-selected period, the processer may cause the safety device to exit the alert mode and return to a standby mode.

In a second aspect, the present invention provides a software product installed on a remote computing device (smartphone, tablet, etc.) that is in communication over a network with a safety device as described above. The software product is arranged to implement a method comprising the steps of:

(a) Receiving an alert signal from the safety device
(b) Receiving video image data from the safety device; and
(c) In response to a first input from a user, displaying the video image data on the device.

In this aspect, the invention provides significant flexibility. A user is presented with information necessary to determine the action to be taken: does the event generating the alert merit any intervention?

In the event that no further action is required, it is preferred that, in response to a second input from the user, the implemented method includes the additional step of sending a standby signal to the safety device, in response to which the safety device is arranged to enter a standby mode in which image data is no longer generated. That is, power is withdrawn from the cameras (and any other components that are activated by the transition to an "alert" state) and the device reverts to a low-power configuration.

On the other hand, if further action is required and the user is able to provide such assistance, the implemented method may include the additional step of displaying a CPR video and/or tutorial on the device.

In order to better discriminate between events that have the potential to lead to drowning and those that do not, the software product may include image processing program code that is configured to carry out image data analysis. In this embodiment, the method includes the steps of: analysing the image data received from the safety device to determine classification of an event recorded in the data and, in response to the classification determination, either: prompting the user to provide the first input (that is, to look at the video image data) or sending a standby signal to the safety device.

In a further aspect the present invention provides an artificial neural network with deep learning capabilities that is in communication with a plurality of remote computing devices on which the software product as described above is stored wherein:

in response to a user classification of an alert signal as either a non-drowning incident or potential drowning incident, the software product is arranged to transmit video image data generated at the time of the alert signal and/or parameters extracted therefrom to the neural network; and the neural network is arranged to generate image analysis procedures that provide automatic detection by the software product of potential drownings.

According to a fourth aspect, the present invention provides a safety device adapted to float on water, the device incorporating:

at least two video camera systems with lenses arranged at a horizontal level around a periphery of the safety device, each camera having a field of view that extends both vertically and horizontally;

an accelerometer arranged to generate a voltage signal in the event that the safety device experiences an accelerating force;

a transceiver that enables two-way wireless communication between the device and a network;

a processor in communication with the accelerometer, transceiver and camera systems and that includes an image analysis module; the processor being arranged such that:

(a) on receipt of a first voltage signal from the accelerometer that exceeds a threshold value, the processer causes the safety device to enter an analysis mode in which:

power is supplied to the camera systems such that each generates an image of its field of view; and the image analysis module is arranged to analyse image data generated by the camera systems to determine classification of an event recorded in the data and, in response to the classification determination, either:

(b) to return the device to a standby mode in which power is no longer supplied to the camera systems; or (c) to cause the safety device to enter an alert mode in which an alert signal is transmitted via the transceiver to a remote device.

In another aspect, the present invention provides an artificial neural network with deep learning capabilities that is in communication with:

a plurality of remote computing devices on which the software product described above is stored; and/or a plurality of safety devices as described above; wherein:

in response to a user classification of an alert signal as either a non-drowning incident or a potential drowning incident, the neural network is arranged to receive video image data generated at the time of the alert signal and/or parameters extracted therefrom; and the neural network is arranged to generate image analysis procedures that provide automatic detection by an image analysis module of the safety devices of potential drownings.

The invention will now be described, by way of example only, and with reference to the accompanying drawings, in which.

Figure 1:
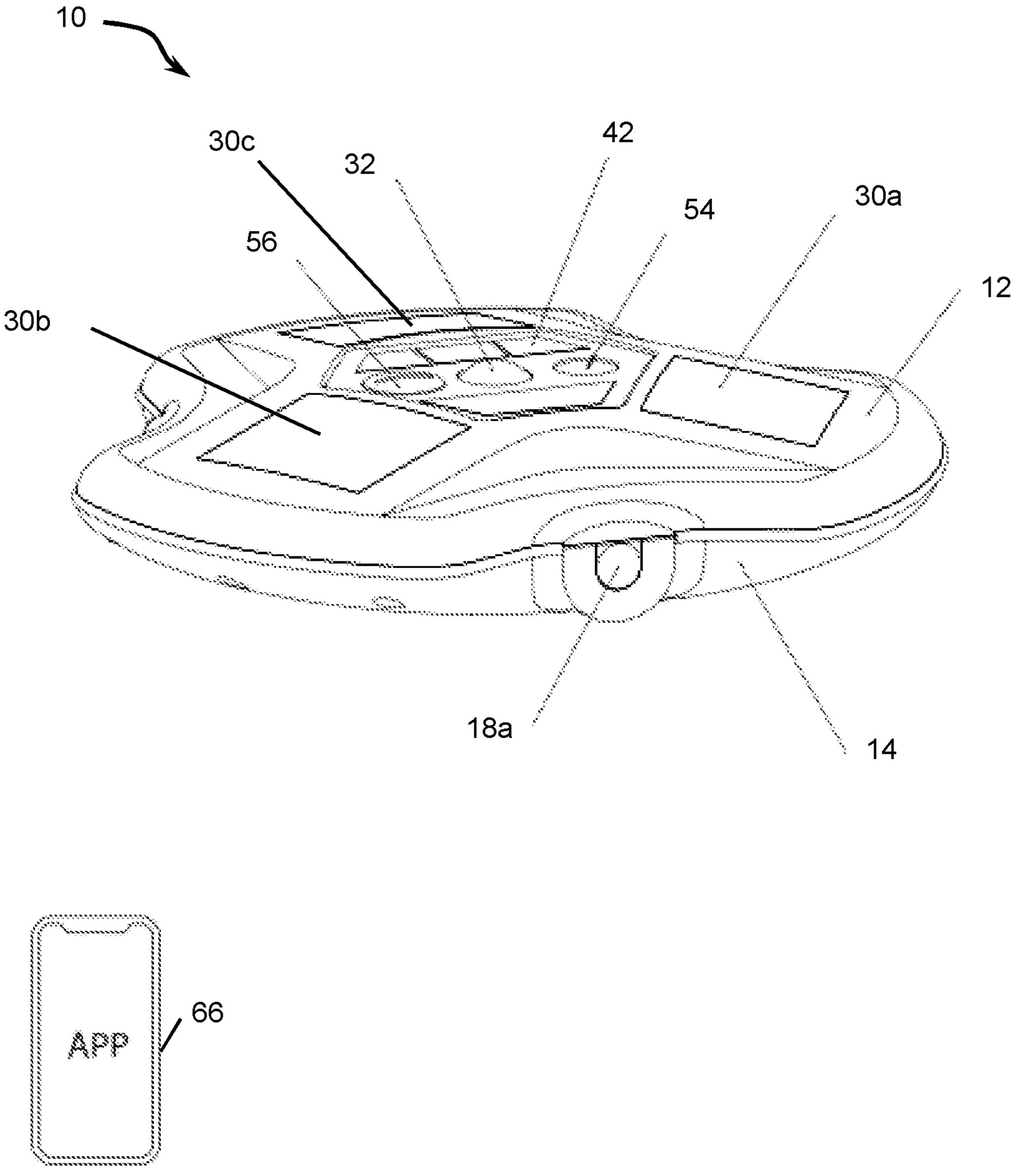
FIG. 1 is an illustration of an embodiment of a safety device in accordance with this invention.

With reference to FIGS. 1 to 4, a safety device 10 in accordance with this invention comprises top 12 and bottom 14 high impact-resistant polycarbonate mouldings that are bonded together with an intermediate gasket 16 to form a watertight flattened disk. The separate components 12, 14, 16 are best seen in the exploded view of FIG. 2. This shape provides sufficient buoyancy and stability to the device 10 to enable it to float in water. The stability is such that the device remains afloat during buffeting by waves that are, under normal conditions, anticipated to be generated in a swimming pool. Waves may arise through windy or stormy weather, or on entry of an object or body to the water. The polycarbonate plastic material of the mouldings 12, 14 is fire-retardant as well as impact, chemical and UV-resistant.

Three lenses 18*a*, 18*b*, 18*c* are moulded over apertures formed around the periphery of the bottom moulding 14. The top moulding 12 contains corresponding dependent tags 20*a*, also with an aperture, that slot behind the lenses 18*a*, 18*b*, 18*c* as the device is assembled (see FIG. 2). Each lens 18*a*, 18*b*, 18*c* has a conic field of view that subtends more than 120° both in the plane of the device and in a perpendicular plane and directs light to a respective camera module 22 mounted inside the device. Each camera module 22 is a VGA colour imaging sensor, this being an inexpensive imaging system that is capable of providing adequate resolution for this application.

Figure 3:
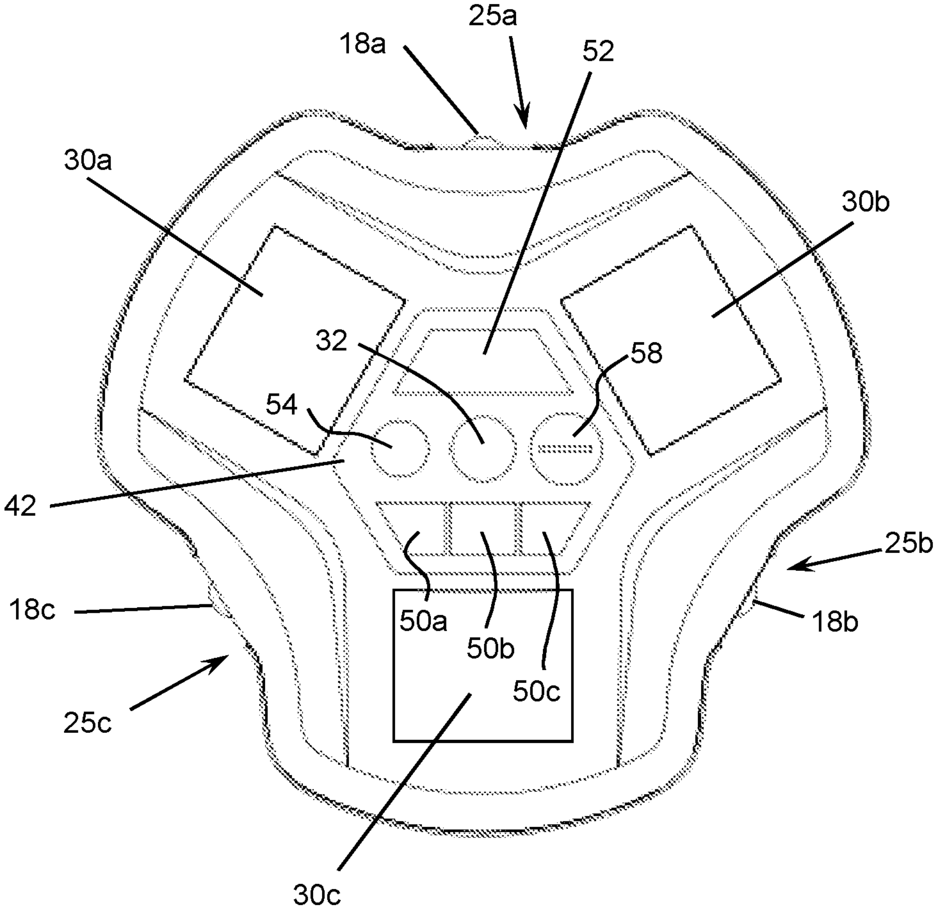
FIG. 3 is a top view of the embodiment shown in FIG. 1, illustrating a camera arrangement that affords a 360° field of view.
Figure 4:
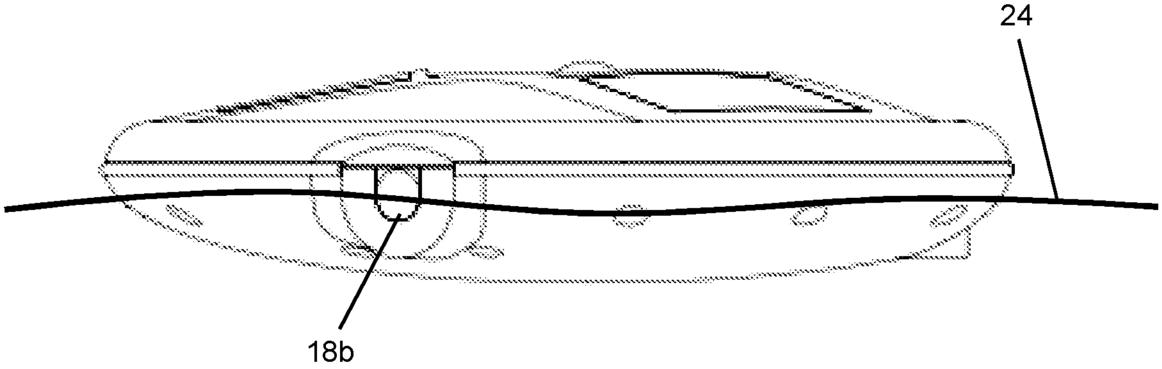
FIG. 4 is an illustration of the device of FIG. 1 as it floats in water, showing the camera location in comparison with the waterline.

FIGS. 3 and 4 illustrate the arrangement of camera lenses 18*a*, 18*b*, 18*c* and hence field of view of the imaging system of the device. As clearly shown in the top plan view of FIG. 3, the camera lenses 18*a*, 18*b*, 18*c* are evenly distributed around the circumference of the device 10. This distribution, in combination with the over 120° field of view provided by each lens 18*a*, 18*b*, 18*c*, means that, for the most part, the device 10 provides a 360° view at the level of the lenses. The buoyancy of the device 10 is such that a water level 24 reaches approximately to the mid-point of the camera lenses 18*a*, 18*b*, 18*c*, as shown in FIG. 4. The 120° field of view of the lenses 18*a*, 18*b*, 18*c* therefore extends both above and below the waterline 24 enabling imaging and surveillance both above and within the water.

As indicated previously, the device 10 is generally disk-shaped and, as shown in FIG. 3, has three shallow recesses 25*a*, 25*b*, 25*c* about its circumference. The camera lenses 18*a*, 18*b*, 18*c* are located centrally in these recesses 25*a*, 25*b*, 25*c*. In use, the device 10 floats untethered on the water and so will inevitably, on occasion, collide with pool walls. Locating the lenses 18*a*, 18*b*, 18*c* within the recesses 25*a*, 25*b*, 25*c* helps shield them during such collisions. Swimming pools come in a wide variety of shapes, with many different wall configurations. The depth of the recesses 25*a*, 25*b*, 25*c* represents a compromise between the range of wall curvatures in which protection is afforded and achieving a truly panoramic field of view. In this embodiment of the invention, there will be blind spots in close proximity to the device 10 in areas between neighbouring lenses 18*a*, 18*b*, 18*c*. The device is therefore manufactured with dimensions such that these blind spots are acceptably small: for example, less than 18 cm.

Inside the device 10 is a printed circuit board (PCB) 26 that carries much of the electronics responsible for its operation. In particular (although not visible in FIG. 2), a microprocessor 27, accelerometer array 28 and transceiver 29 are securely mounted on the printed circuit board 26. The microprocessor 27 is responsible for the control and data processing carried out by the device 10. In practice, there may not be a single onboard microprocessor but many electronic components that are each dedicated to the control of particular elements. These are, for convenience of this description, grouped together under the umbrella term "microprocessor" or "processor", without loss of generality. Each accelerometer within the array 28 generates a voltage signal in response to an acceleration along any one of three axes, the magnitude of the voltage increasing with larger accelerations. The transceiver 29 can be linked to a Wi-Fi network to enable the device 10 to engage in two-way communication.

Referring back to FIGS. 1 and 2, an upper surface of the top moulding 12 incorporates an arrangement of window apertures, three in this embodiment, that are overmoulded with transparent polycarbonate windows 30*a*, 30*b*, 30*c* and an additional lens 32 overmoulding that is centrally located towards the highest point of the disk-shaped device 10. The windows 30*a*, 30*b*, 30*c* form water-tight barriers that allow the passage of light to internally-located solar cells 34*a*, 34*b*, 34*c*. Also inside the device 10 is a rechargeable battery pack 36 (2×lithium ion cells) that is housed within an enclosure 38 formed in the bottom moulding 14. A cover 40 to the enclosure protects the battery 36 in the unlikely event of water ingress. The microprocessor 27 and other electronic components are powered by the rechargeable battery pack 36. The power generated by the solar cells 34*a*, 34*b*, 34*c* is, under management of the microprocessor 27, used to trickle charge the battery 36. This avoids the battery charge becoming depleted during periods of non-use and also helps restore the charge after intermittent use. Overall, this will extend the time for which the battery 36 will operate without external charging. In regions of high solar energy, the solar cells 34*a*, 34*b*, 34*c* will better maintain battery charge level and so extend battery life.

A membrane keypad 42 is affixed to a central region of the upper surface of the top moulding 12 with wired connection to the PCB 26. The keypad 42 includes three holes 44, 46, 48; three pressure-sensitive contact pads 50*a*, 50*b*, 50*c* that, on depression, generate respective electronic signals that are communicated to the microprocessor 27 and permit a user to control operation of the device; and a window region 51. When the keypad 42 is in position, three LED chips 52 (red, amber and green) that provide an indication of operational mode of the device are visible through the window region 51.

Figure 2:
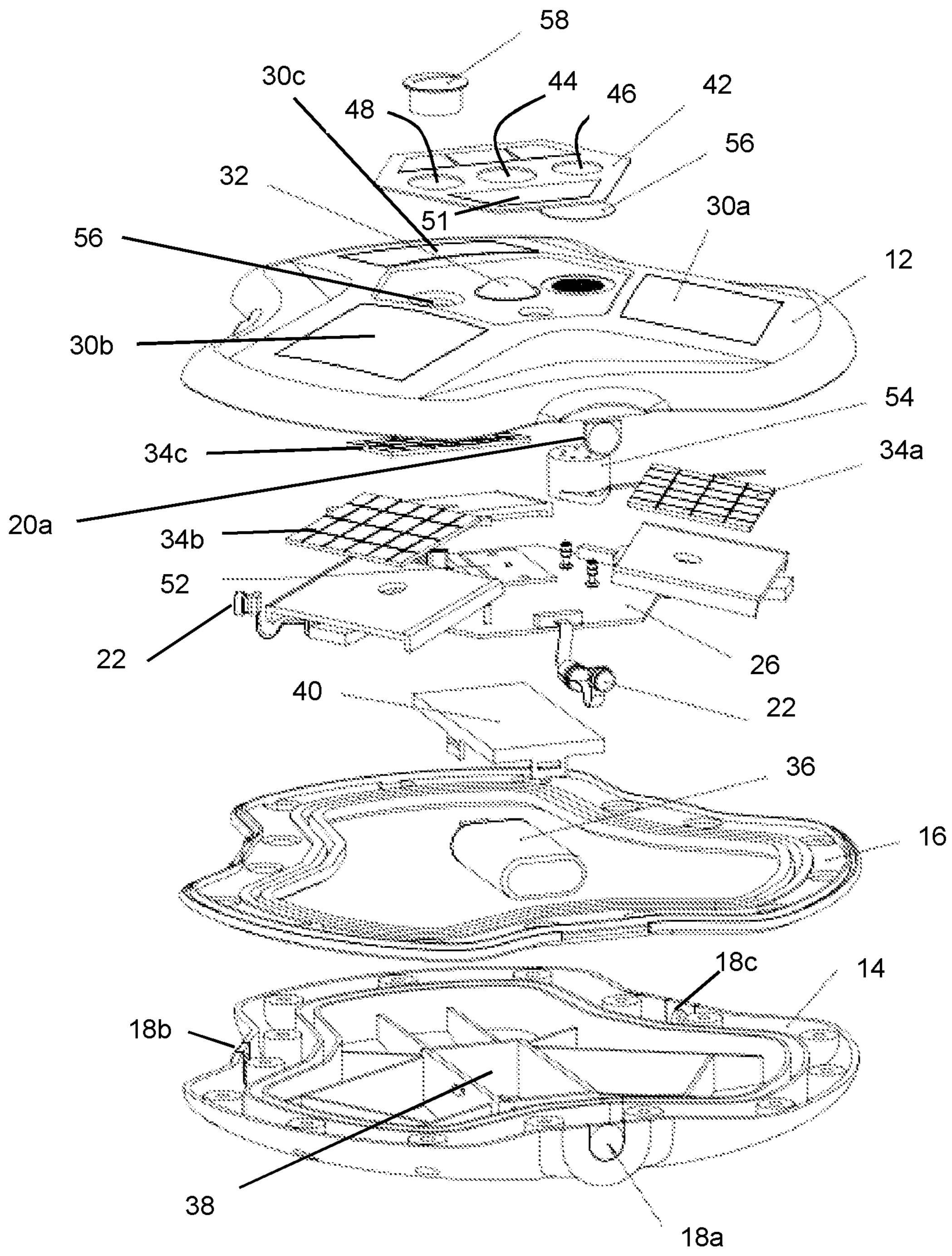
FIG. 2 is exploded view of the device shown in FIG. 1, showing internal components.

The first hole 44 fits over the overmoulded central lens 32, which transmits light emitted from an internal beacon (53, although not shown in FIG. 2). The second 46 and third 48 holes are aligned with corresponding moulding apertures. A siren 54 is located within the device 10 below the aperture and second hole 46, with its audio output directed via a loudspeaker through the hole. The siren 54 and beacon 53 together comprise an alert system that serves to warn any person who may be in the vicinity that a potential drowning incident has been detected. A Gore-Tex acoustic membrane 56 is located intermediate the second hole 46 and corresponding moulding aperture in order to provide waterproof protection to the siren 54. The third hole 48 allows access via the moulding aperture to a USB-C charging port 56. A compatible charger, for example a USB-C smartphone charger, can therefore be plugged into the charging port 56 in order to charge the battery 36. When not actively in use, access to the charging port 56 is sealed by a rubber plug 58.

The keypad pressure-sensitive contact pads 50*a*, 50*b*, 50*c* are configured as, for example, an on/off button, an alarm-cancel button and a button to initiate Wi-Fi pairing. Other configurations can be used in other embodiments, including button combinations to provide additional functions, if required. The LEDs 52 are configured to provide indications to a user as to the status of the device 10. For example, one LED indicates the status of the battery 36: steady on for fully charged and flashing for low charge. Another will light up if the device is on and in stand-by mode. A third indicates Wi-Fi connectivity: steady on for connected and flashing if in the process of connecting to a network. As will be apparent to one skilled in the art, other light combinations may be used to provide alternative indications of device status to a user.

The camera modules 22, solar cells 34*a*, 34*b*, 34*c*, battery 36, siren 54, beacon 53 and keypad 42 are all connected to the circuitry of the PCB 26, as shown in the exploded view of FIG. 2. Although not visible in this figure, other components are mounted on the PCB 26, as indicated schematically in FIG. 5. In particular, the microprocessor 27, accelerometer array 28 and transceiver 29 are securely mounted on the board 26. In the event of sudden movement of the device 10, each accelerometer within the array 28 generates a voltage signal that is detected by the microprocessor 27. The accelerometers 28 are distributed about the PCB 26 to enable sudden movement of any part of the device 10 to be detected. Use of multiple accelerometers 28 also allows the device 10 to continue reliable monitoring of the pool in the event of breakage or malfunction of any single accelerometer. The transceiver 29 is also connected electronically to the microprocessor 27 and can be linked to a Wi-Fi network to enable two-way communication between the device 10 and an application 64 running on a computing device of a user, such as a smartphone or tablet 66. In some embodiments the transceiver 29 is integral with the processor 27: for example a 802.11b/g/n Wi-Fi module integrated with antenna and ARM Cortex M4 microcontroller. They are illustrated as separate components here for clarity of function and without loss of generality.

The smartphone or tablet application 64 is an important component of this system and its functionality enables much of the convenience of the system to be realised. The app 64 can be coded in a known manner to provide a number of functional features. On downloading, the app 64 prompts the user to input information about the pool in which the safety device 10 is to be used and the data entered is stored for future reference. The device 10 is linked with the app 64, initially by connection to the same Wi-Fi network (generally the pool-owner's home network). A number of computing devices 66 running the app 64 can be paired with the same safety device 10. Default values of various user-adjustable settings of the device are set in accordance with pool data entered on download. Thereafter, these settings can be selected and adjusted by the user via the app 64. In use, if the safety device 10 detects an unexpected pool entry, an "alert" warning is sent to the app 64. Images 70 collected by the device cameras 22 are buffered for a short time by the microprocessor and then transmitted over the Wi-Fi network to the computing device 66. The images 70 are stored on the device 66 temporarily, where they may be accessed by the app 64 in near real-time for a quick check of all camera images. The app 64 includes image processing software, which is capable of carrying out a number of functions. It is, at least, configured to stitch different camera images together to provide a 360° view. Processed images may be displayed on the computing device 66 for review by the user. For longer-term storage, the images 70 (raw and/or processed) are transferred to cloud-based data storage 68. The app 64 also provides a link to a video and/or tutorial that demonstrates CPR.

Figure 5:
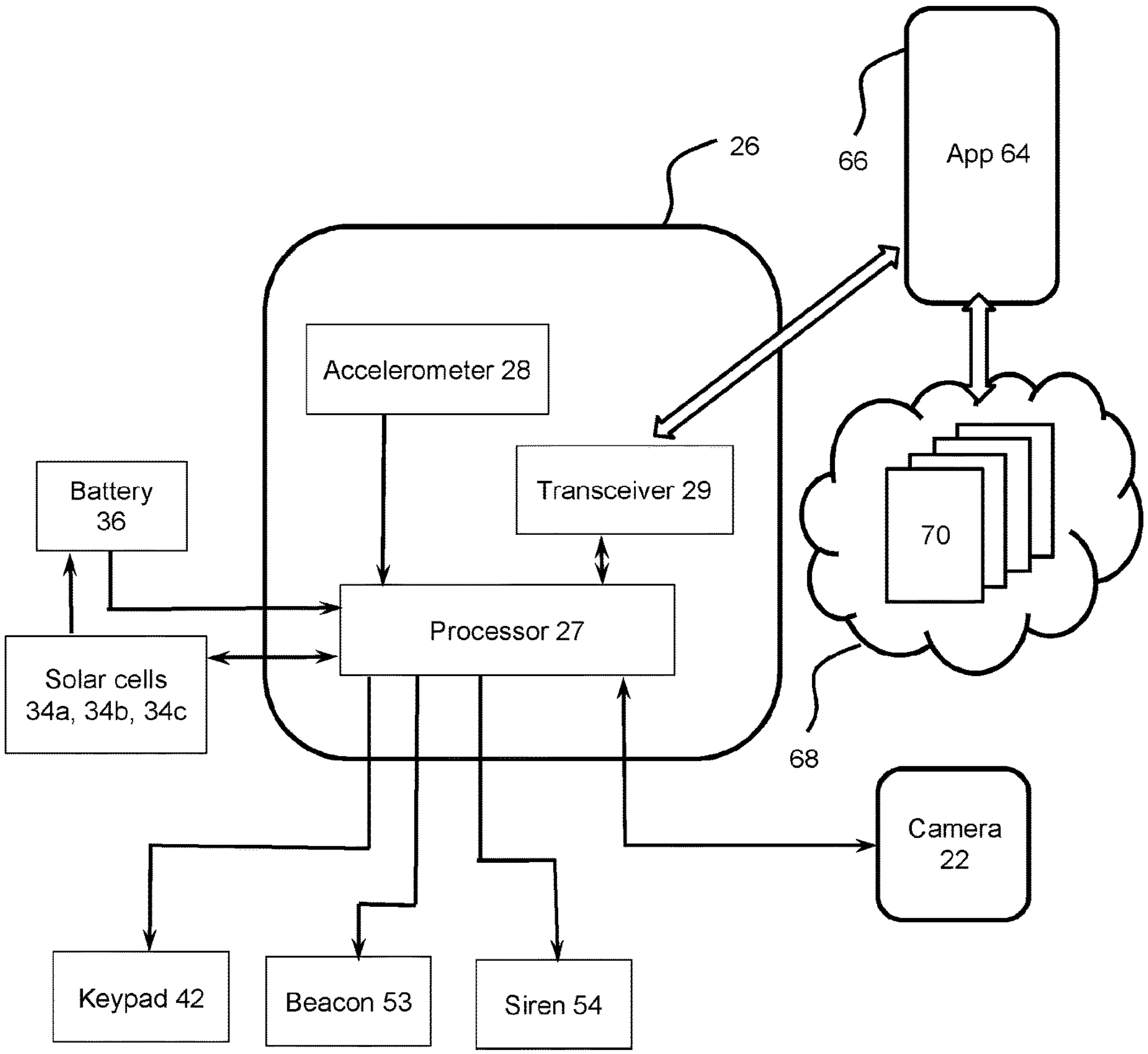
FIG. 5 is a schematic illustration of the electronic components of the safety device of FIG. 1.

FIG. 5 shows the electronic configuration of the device 10 and, with reference to FIGS. 4 and 5, operation of the device will now be described. A user depresses the relevant keypad 42 control in order to switch the safety device 10 on and to its standby mode. In this mode, the processor 27 ensures that power from the battery 36 is supplied to the accelerometer array 28, transceiver 29 and one of the keypad LED 52*s*, which illuminates to indicate the standby operational mode. The output of both accelerometer array 28 and transceiver 29 are continually monitored by the microprocessor 27. The safety device 10 is placed, untethered, in the swimming pool, where it floats freely on the surface.

This device 10 is designed as a warning system for an unoccupied pool. In the event that any swimmer wants to use the pool, the device 10 is removed and switched off via keypad control. Alternatively, on/off control may be effected from the app 64. If children or non-swimmers are in the pool, it is expected that alternative supervision is provided.

In an unoccupied pool, the safety device 10 is, as shown in FIG. 4, left to float, rocked by small ripples, and to drift under the influence of wind and any currents set up in the pool by, for example, the filter system. A threshold level of the voltage generated by the accelerometer array 28 is set at a default level such that it is not exceeded by small ripples or disturbances by small objects such as twigs that are expected to fall into an unoccupied pool. If a heavier object falls into the pool, larger ripples and waves will significantly disturb the water surface, the device 10 will suddenly be displaced and the accelerometer array 28 will generate a significantly larger output voltage. By default, the voltage signal that is compared to the threshold is that which arises through vertical (z-axis) displacement. This though, along with the level of the threshold voltage, can be adjusted by the user via the app 64. In any case, the generated voltage is detected by the processor 27 and, if it exceeds the selected threshold, the processor switches the device 10 to its alert state and sends an alert in the form of a push notification to the app 64.

When the device 10 enters its alert state, the processor 27 directs power to the cameras 22, beacon 53 and siren 54. The cameras 22 begin to collect 360° video images of the pool. Image data 70 is passed to the transceiver 29, which transmits it to the computing device 66 for temporary storage. The beacon 53 and siren 54 serve to alert anyone who may be nearby. In the event that someone requires rescue from the pool, this may be the fastest way to get help. When an alert has been received by the computing device 66, the user opens the app 64, which will then access the video images 70 that are being stored on the device 66. The video images 70 are displayed to a user, who can then determine whether or not further action is necessary. In a serious case, emergency services can be called, using the smartphone 66 or otherwise, and a video demonstration and/or tutorial of CPR played.

The alert state is maintained for a set period of time, which may be adjusted by the user in the app 64. On expiration of a first alert period, power is disconnected from the beacon 53 and siren 54 to prevent noise nuisance and draining the battery 36. At this time, or later if preferred, the cameras 22 are also switched off. Images 70 collected during completed alerts will no longer be required for near real-time access and so are transferred to longer-term storage in the cloud 68.

Clearly, on many occasions, an alert will be generated without serious consequences. For example, a person who has fallen into the pool is in no danger of drowning and can climb out alone. Alternatively, the alert may arise through a false alarm, such as a bird landing on the pool. On receipt of any alert notification, a user is able to access real-time camera images in the form of a video that is shown in the app 64. Once the cause of the alert is identified the user may dismiss the notification if there is no cause for concern or if the situation is self-resolving. A signal is then sent from the app back to the safety device 10, indicating that the processor 27 is to revert the device to standby mode and no further action is taken.

In alternative embodiments, more sophisticated discrimination between standby and alert states of the safety device 10 is provided. In these embodiments, the voltage signals from each axis of each accelerometer in the array 28 are taken into account to determine whether or not an alert threshold is exceeded. This may make use of logical AND or OR conditions and will allow better discrimination between, for example, wind-generated motion and motion caused by an object breaking the surface of the water. However the threshold level is defined, receipt of a voltage signal or combination of signals that exceeds the threshold causes the device 10 to register an unexpected water entry event and to enter an analysis mode. In this mode, the microprocessor 27 directs power to the cameras 22 and sends an analysis signal to the app 64. The cameras 22 start capturing 360° video images 70, which are transferred to the app 64, where they are subjected to one or more image processing routines.

These routines are configured to analyse the image data in order to first locate the object that triggered the unexpected water entry event and then to extract information that will assist with object identification and determination of the level of response required. In the first instance, the position of the object is identified and the camera's field of view narrowed in order to collect an image of the object of interest at higher resolution. Next, the object's size is analysed, which may, for example, allow a distinction to be made between a bird and a child. Tracking the object's movement pattern may provide an indication that the object is leaving the pool without further assistance. If the result of the analysis is a determination that the unexpected water entry has been resolved (person leaving the pool) or does not match a pattern consistent with a human entry, the microprocessor 27 will restore the device 10 to its standby mode. The app 64 is configured to send a non-urgent notification to the user, who may then, out of interest, choose to access the stored images 70 for that time frame. On the other hand, if the result of the analysis indicates that the unexpected water entry requires further attention, the microprocessor 27 will instead activate the safety device 10 fully and place it in its alert mode.

With this embodiment, if an alert is sent to the app 64, and the user, on accessing the images, determines that this is a false alert and dismisses the notification, the image processing part of the app 64 is set to register these image parameters as not being in accordance with a situation that requires an alert. This information is then used to guide the app in its analysis of future unexpected water entries.

In alternative embodiments, the software required for image processing is stored on the device 10 and accessed by an image processing module of the microprocessor 27. In these embodiments, the device will switch to analysis mode if the accelerometer voltage threshold is exceeded and power will be supplied to the cameras. Images collected will though be analysed locally using the processing power onboard the device in order to determine whether the accelerometer signal arose through a potential drowning event or otherwise. If the event can be dismissed as one not requiring further intervention, then the device 10 is returned to its standby mode. Image data 70 may be sent to the cloud 68 for storage. Otherwise, the device 10 is switched to its alert mode: the siren 54 and beacon 53 are activated and image data, along with an alert signal, are sent to the app 64.

In one, more powerful, implementation it is envisaged that this device is linked with cloud-based artificial intelligence service. As more events are detected by devices in accordance with this invention, the more information is available as to whether particular data patterns are dismissed or acted upon as potential drowning incidents by users. Such data may be input to a cloud-based neural network with deep learning capabilities to improve the ability of the device 10 and/or the app 64 to discriminate between likely drowning events and other causes of an alert. With time, this will significantly reduce the number of false alarms.

The electronic components are selected to draw minimal power when the device is in standby mode. In this mode, the microprocessor 27 continually monitors battery 36 state of charge and, if it falls below a threshold level, sends a signal to the LEDs 52 and an alert to the app to indicate that the device needs recharging.

Figure 6:
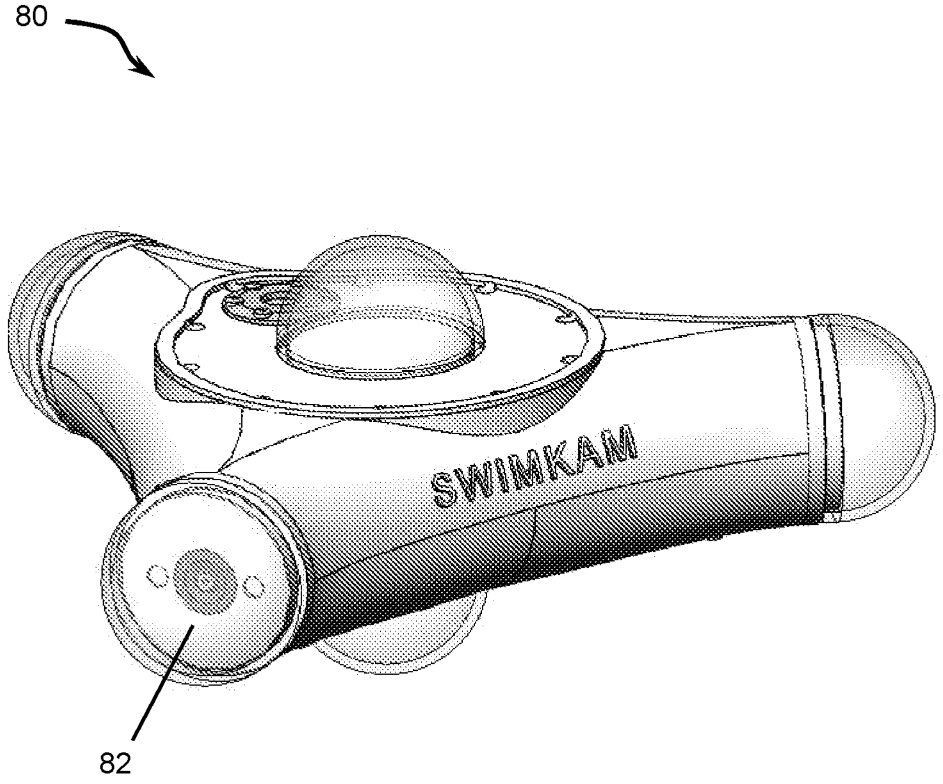
FIG. 6 is an illustration of an alternative embodiment of the safety device in accordance with this invention.

FIG. 6 shows an alternative embodiment of a safety device 80 in accordance with this invention. This alternative embodiment 80 retains the overall flattened shape for buoyancy and stability but, viewed from above, has an approximately triangular profile, with curved sides. An outwardly-oriented camera 82 is mounted at each corner of the triangle. This configuration does not leave any camera blind spots and so provides a clearer, more completely panoramic, field of view. On the other hand the lens material will need to be tougher as it is not protected from collisions with pool walls.

The invention claimed is:

1. A safety device, the device comprising:

at least two video camera systems with lenses arranged at a horizontal level around a periphery of the safety device adapted to float on water such that a water level reaches approximately to the mid-point of the lenses, each camera having a field of view that extends both vertically and horizontally;

an accelerometer arranged to generate a voltage signal in the event that the safety device experiences an accelerating force;

a processor in communication with both the accelerometer and camera systems and arranged such that on receipt of a voltage signal from the accelerometer that exceeds a threshold value, the processor causes the safety device to enter an alert mode in which power is supplied to the camera systems such that each generates an image of its field of view.

2. The safety device as claimed in claim 1, wherein the device also includes a transceiver, the processor being arranged such that when the device enters the alert mode, it transmits an alert signal to a remote device.

3. The safety device as claimed in claim 1, wherein the device includes a battery.

4. The safety device as claimed in claim 3, wherein the device includes at least one solar cell electrically connected to the battery.

5. The safety device as claimed in claim 1, wherein the device includes at least one of: a light-emitting beacon and a siren, the device being configured such that power is supplied to the at least one of the beacon and siren in the alert mode.

6. The safety device as claimed in claim 1, wherein the camera lenses are located in respective recesses within a body of the safety device.

7. The safety device as claimed in claim 1, in which three camera systems with respective lenses are arranged around the periphery of the safety device, each camera having a field of view that extends at least 120° in a horizontal plane.

8. The safety device as claimed in claim 1, in which the accelerometer is an array of accelerometers spatially distributed about the device.

9. The safety device as claimed in claim 8, in which the threshold voltage level is determined with reference to respective voltage signals from each accelerometer within the array.

10. The safety device as claimed in claim 2, wherein image data representative of the images generated by the camera systems is transmitted to a remote location.

11. The safety device as claimed in claim 10, wherein the remote location is a mobile computing device.

12. The safety device as claimed in claim 10, wherein the remote location is a networked server.

13. The safety device as claimed in claim 1, wherein after a pre-selected period in the alert mode, the processor causes the safety device to exit the alert mode and return to a standby mode.

14. A software product installed on a remote computing device that is in communication over a network with a safety device as claimed in claim 1, the software product arranged to implement a method comprising the steps of:

(a) Receiving an alert signal from the safety device;

(b) Receiving video image data from the safety device; and (c) In response to a first input from a user, displaying the video image data on the device.

15. The software product as claimed in claim 14, wherein, in response to a second input from the user, the implemented method includes the additional step of sending a standby signal to the safety device, in response to which the safety device is arranged to enter a standby mode in which image data is no longer generated.

16. The software product as claimed in claim 15, wherein, in response to a third input from the user, the implemented method includes the additional step of displaying a CPR video and/or tutorial on the device.

17. The software product as claimed in claim 14, wherein the software product includes image processing program code that is configured to carry out image data analysis and wherein, prior to the step of displaying the image data to the user, the implemented method includes the steps of: analysing the image data received from the safety device to determine classification of an event recorded in the data and, in response to the classification determination, either: prompting the user to provide the first input or sending a standby signal to the safety device.

18. An artificial neural network with deep learning capabilities that is in communication with a plurality of remote computing devices on which the software product as claimed in claim 14 is stored wherein:

in response to a user classification of an alert signal as either a non-drowning incident or a potential drowning incident, the software product is arranged to transmit video image data generated at the time of the alert signal and/or parameters extracted therefrom to the neural network; and the neural network is arranged to generate image analysis procedures that provide automatic detection by the software product of potential drownings.

19. A safety device, the device comprising:

at least two video camera systems with lenses arranged at a horizontal level around a periphery of the safety device adapted to float on water such that a water level reaches approximately to the mid-point of the lenses, each camera having a field of view that extends both vertically and horizontally;

an accelerometer arranged to generate a voltage signal in the event that the safety device experiences an accelerating force;

a transceiver that enables two-way wireless communication between the device and a network;

a processor in communication with the accelerometer, transceiver and camera systems and that includes an image analysis module; the processor being arranged such that:

(a) on receipt of a first voltage signal from the accelerometer that exceeds a threshold value, the processor causes the safety device to enter an analysis mode in which:

power is supplied to the camera systems such that each generates an image of its field of view; and the image analysis module is arranged to analyse image data generated by the camera systems to determine classification of an event recorded in the data and, in response to the classification determination, either:

(b) to return the device to a standby mode in which power is no longer supplied to the camera systems; or (c) to cause the safety device to enter an alert mode in which an alert signal is transmitted via the transceiver to a remote device.

* * * * *